United States Patent [19]

La Ferte

[11] 4,313,710
[45] Feb. 2, 1982

[54] WIND MOTOR

[76] Inventor: Romeo La Ferte, 3905 Beethoven St., Ville Brossard, Province of Quebec, Canada, J4Z 2W5

[21] Appl. No.: 182,460

[22] Filed: Aug. 28, 1980

[30] Foreign Application Priority Data

May 26, 1980 [CA] Canada .................................... 352691

[51] Int. Cl.³ .............................................. F03D 7/06
[52] U.S. Cl. ...................................... 415/2 R; 415/45
[58] Field of Search ............................. 415/2 R-4 R, 415/DIG. 8, 45; 416/121 A, 122 A, 41, 197 A

[56] References Cited

U.S. PATENT DOCUMENTS

| | | | |
|---|---|---|---|
| 63,498 | 4/1867 | Gallup | 415/2 R |
| 343,000 | 6/1886 | Bouteiller | 415/2 R |
| 588,572 | 8/1897 | Hardaway | 415/4 |
| 752,764 | 2/1904 | Dunne | 416/197 A |
| 772,786 | 10/1904 | Clifford | 415/2 R |
| 1,225,033 | 5/1917 | Jackson | 415/2 R |
| 1,469,064 | 9/1923 | Zucker | 416/41 X |
| 1,503,061 | 7/1924 | Pendergast | 415/2 R X |
| 4,177,009 | 12/1979 | Baum et al. | 416/197 A X |

FOREIGN PATENT DOCUMENTS

| | | | |
|---|---|---|---|
| 7226 | 3/1877 | Canada . | |
| 24752 | 11/1886 | Canada . | |
| 110485 | 2/1908 | Canada . | |
| 267273 | 1/1927 | Canada . | |
| 515331 | 3/1921 | France | 415/2 R |
| 169733 | 9/1922 | United Kingdom | 415/2 R |
| 185939 | 9/1922 | United Kingdom | 415/2 R |
| 408049 | 4/1974 | U.S.S.R. | 415/2 R |

*Primary Examiner*—Everette A. Powell, Jr.

[57] ABSTRACT

A wind motor is disclosed. The motor comprises a stator including top and bottom horizontal discs mounted on upstanding posts and an intermediate annular disc parallel to the top and bottom discs, also mounted on the upstanding post and a plurality of air-directing blades mounted between the intermediate and bottom discs. A rotor has a shaft journalled at the center of the top and bottom disc and vertical blades extending radially towards the blades of the stator. The wind is directed by the stator blades onto the rotor blades and ejected through the central opening in the intermediate disc and the space between the top and intermediate discs, thus encountering minimum resisting surfaces.

2 Claims, 11 Drawing Figures

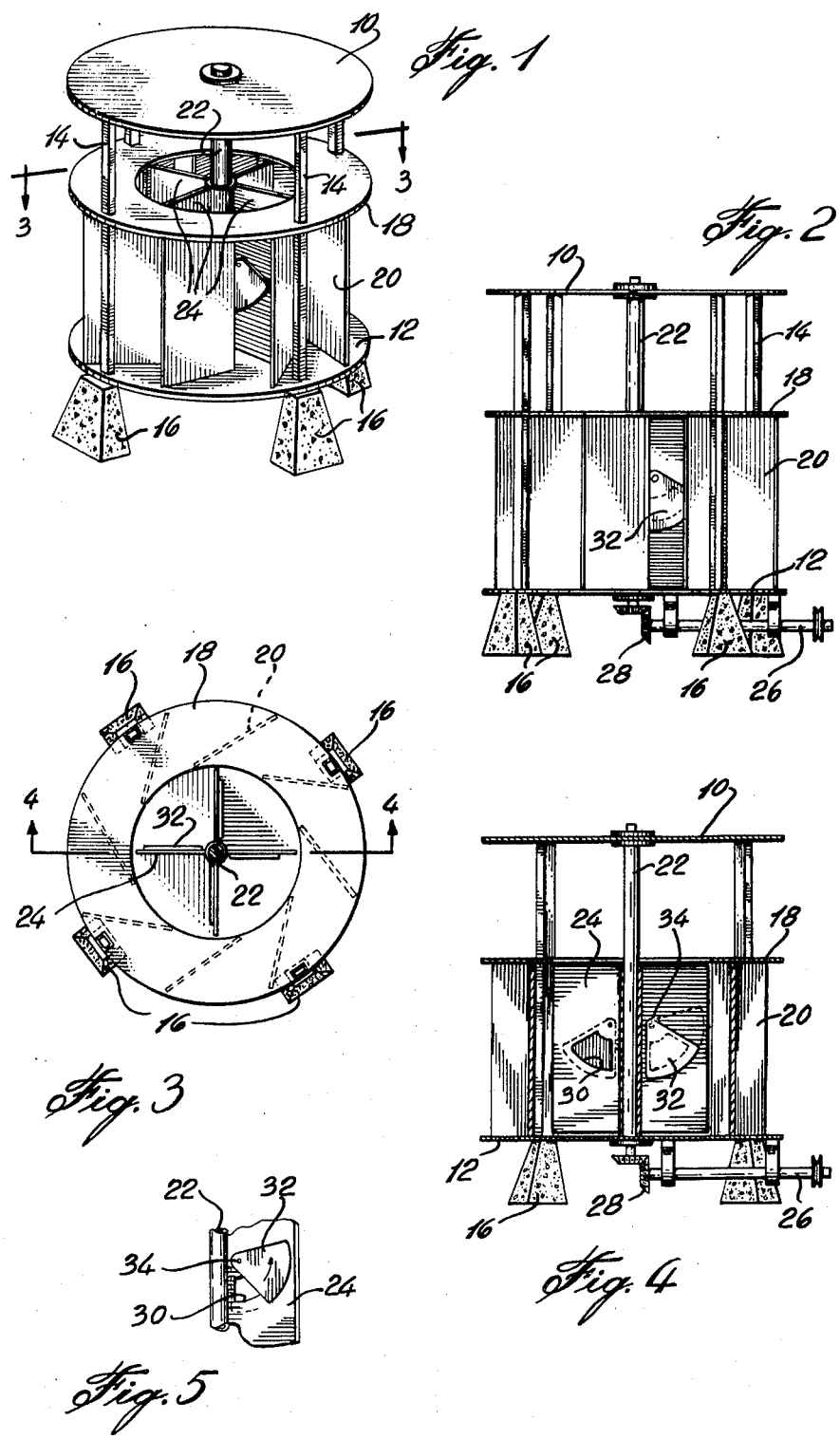

WIND MOTOR

This invention relates to a wind motor.

With the increasing cost of energy, the scientists are now looking at wind motors as a suitable source of power. Various types of wind motors were developed at the beginning of the century, including some which did not require orientation with respect to the direction of the wind. An example of such motors is the one disclosed in Canadian Pat. No. 267,273, issued Jan. 4, 1927. However, the wind motors were primarily designed for individual houses and were of relatively small size due to the limited power requirements at that time. Nowadays, it is required to build wind motors of large size in order to produce a substantial amount of power per unit, and the problem of resistance to the force of the wind of these larger units must be taken into consideration in the design.

It is therefore the object of the present invention to provide a wind motor which does not require orientation with respect to the direction of the wind and which offers a low resisting surface to the wind.

The wind motor in accordance with the invention comprises a stator including top and bottom horizontal discs mounted on upstanding posts, an intermediate annular disc parallel to the top and bottom discs and also mounted on the upstanding posts, and a plurality of directing blades mounted on the intermediate and bottom discs.

A rotor has a shaft journalled at the center of the top and bottom discs and vertical blades extending radially toward the blades of the stator. The wind is directed by the stator blade onto the rotor blades and ejected through the center opening in the intermediate disc and the space between the top and intermediate discs, thus encountering a minimum resisting surface.

In a preferred embodiment of the invention, an opening is provided in each rotor blade and a plate suspended above the opening for closing the opening in the stationary position of the rotor, but adapted to uncover such opening by centrifugal forces during rotation of the rotor, so as to control the speed of the rotor.

In another embodiment of the invention, the stator blades are provided with means for automatically varying their angular position, so as to control the speed of the rotor. The stator blades are pivotally mounted between the intermediate and bottom discs and the means for varying the angular position of the stator blades comprises a ring rotatably mounted on the rotor shaft below the bottom disc, a linkage interconnecting the ring to each of the stator blades for rotating the same, and means for automatically rotating the ring in accordance with the speed of the shaft.

The means for automatically rotating the ring in accordance with the speed of the shaft preferably comprises a spring interconnecting the spring to the stator for biasing the stator blades to a closed position, a rope having one end secured to the stator and its other end secured to the ring, a weight adapted to pull on the rope to rotate the ring against the action of the spring in a direction such as to open the stator blades, a hydraulic cylinder having its piston connected to the weight, and a hydraulic pump operated by the rotor shaft for operating the hydraulic cylinder to counteract the action of the weight in accordance with the speed of the rotor, so as to allow the spring to close the stator blades as the speed of the shaft increases until an equilibrium is reached.

A safety speed limiter may also be mounted on the rotor shaft. Such safety speed limiter preferably includes a speed governor mounted on the shaft and a lever-actuating means responsive to the speed governor for releasing the one end of the rope from the stator when a predetermined speed limit is exceeded, thereby automatically allowing closure of the stator blades under the action of the spring.

The invention will now be disclosed, by way of example, with reference to the accompanying drawings, in which:

FIG. 1 illustrates a perspective view of a wind motor in accordance with the invention;

FIG. 2 illustrates a side view of the wind motor of FIG. 1;

FIG. 3 illustrates a view taken along line 3—3 of FIG. 1;

FIG. 4 illustrates a view taken along line 4—4 of FIG. 3;

FIG. 5 illustrates a partial view of a plate located in the rotor blades;

Figure 6:
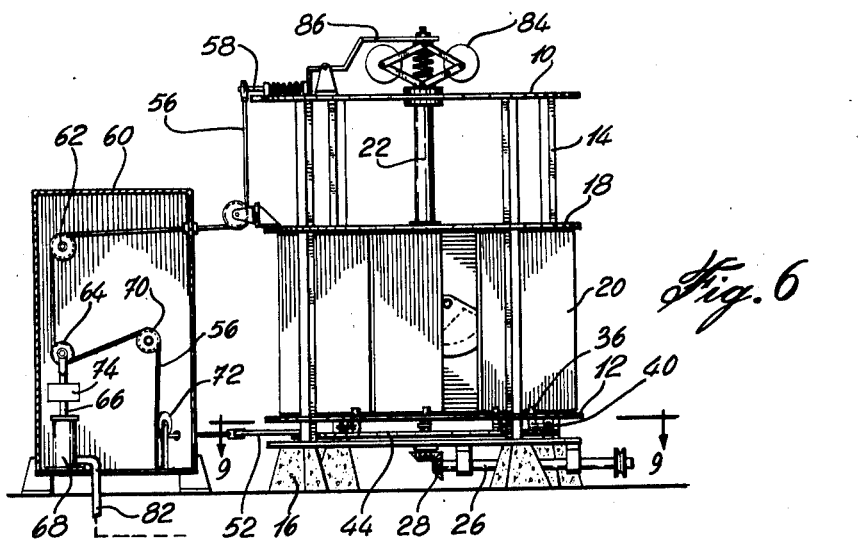
FIG. 6 illustrates another embodiment of a wind motor in accordance with the invention.
Figure 11:
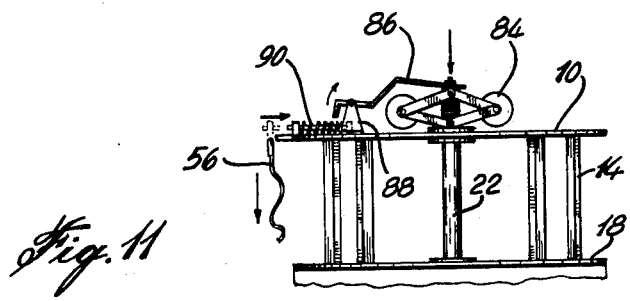
FIG. 11, located on the second sheet of drawings, illustrates a partial view of the embodiment of FIG. 6 with the speed governor in the operated position to close the stator blades.

Referring to FIGS. 1 to 5 of the drawings, there is shown a first embodiment of a wind motor having a stator including imperforate top and bottom horizontal discs 10 and 12 mounted on upstanding posts 14 anchored in cement pillars 16. An intermediate annular disc 18 is also secured to posts 14 parallel to discs 10 and 12, about the two-thirds of the height of the posts, and a plurality of directing vertical blades 20 are mounted between the intermediate and bottom discs 18 and 12. A rotor having a shaft 22 and radial blades 24 extending towards stator blades 20, is rotatably mounted at the center of discs 10 and 12. Shaft 22 is coupled to output shaft 26 through gears 28. Annular disc 18 has a central circular opening which is coaxial with said shaft and has a diameter substantially equal to the rotor diamater.

In operation, the wind enters into the stator from any direction and is directed by stator blades 20 onto the rotor blades to cause shaft 22 to rotate. The wind is ejected through the center opening in the intermediate annular disc 10 and into the space between discs 10 and 18. The wind directly passing between discs 10 and 18 exerts a suction effect which assists the ejection of the air from the rotor.

Each rotor blade is provided with an opening 30, which is closed by a plate 32 suspended about an axis 34 above the opening. The plate 32 pivots about axis 34 by centrifugal forces during rotation of the rotor, so as to uncover the opening 30 and thus reduce the speed of the motor. This arrangement permits to control and stabilize the speed of the rotor under excessive wind velocity.

Figure 7:
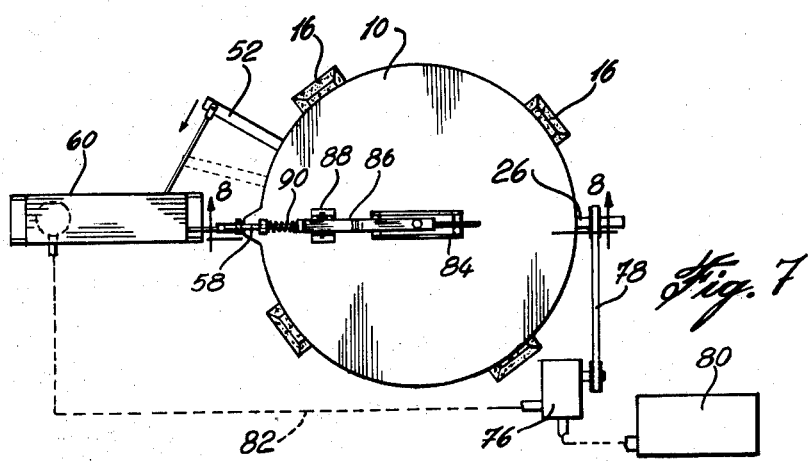
FIG. 7 illustrates a top view of the embodiment shown in FIG. 6.
Figure 9:
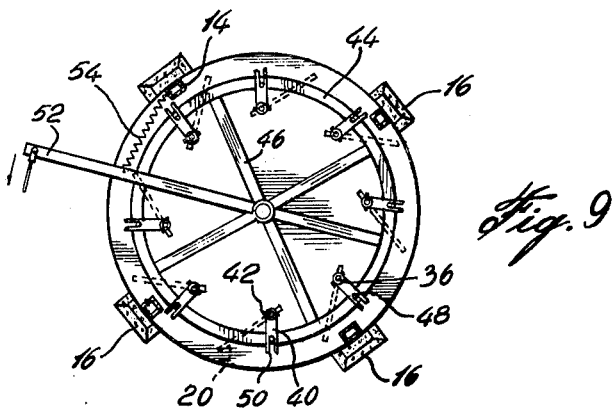
FIG. 9 illustrates a view taken along line 9—9 of FIG. 6.
Figure 10:
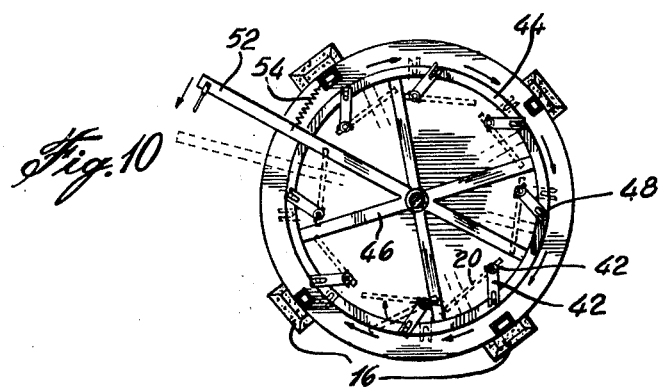
FIG. 10 illustrates a view similar to FIG. 9 but with the stator blades in the closed position.
Figure 8:
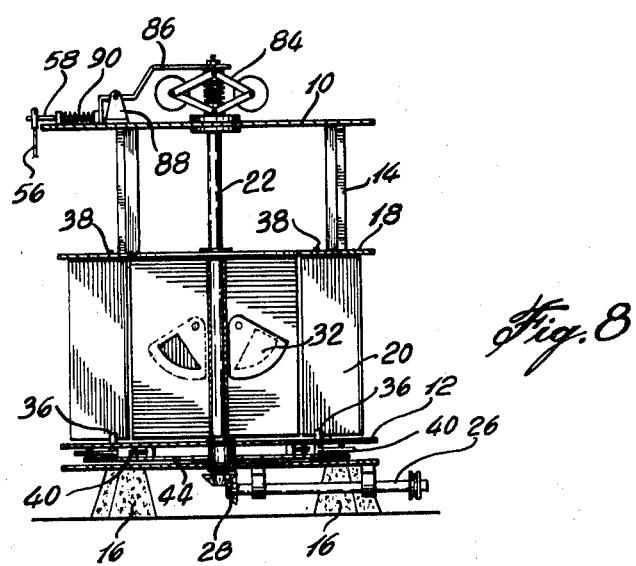
FIG. 8 illustrates a section view of the embodiment shown in FIG. 6.

FIGS. 6 to 11 show another embodiment of the invention, wherein the stator blades 20 are movable, so as to vary the amount of the wind hitting the rotor blades. The elements of this embodiment, which are identical to the elements of the first embodiment, have been designed by the same reference numerals and are not further disclosed. The stator blades 20 are each pivotally mounted about an axis 36 extending through disc 12 and axis 38 extending through disc 18 (FIG. 8). Each axis 36 extending through the bottom disc 12 is provided with a lever 40, which is locked to the axis by a pin 42. A ring 44 having a plurality of spokes 46, is rotatably mounted on shaft 22 below disc 12 and such ring is provided with a plurality of pins 48, which are engaged in corresponding slots 50 in the levers 40. The ring 44 is operated by a handle 52 to open and close the stator blades, as shown in FIGS. 9 and 10. The stator blades are biased to a closed position by means of a tension spring 54 attached to handle 52 and to a post 14. In the closed position of the stator blades 20, a suction is created at the trailing surface of blades 24 and this helps in retarding the rotor.

The handle 52 is operated by an automatic control mechanism including a rope 56 attached at one end to a safety pin 50 carried by top disc 10 and which will be further disclosed later. The rope 56 enters into a control box 60 and passes around a pulley 62, which is fixed to the control box, a pulley 64 which is mounted on the end of piston 66 of a cylinder 68, two other pulleys 70 and 72 fixed to the control box, and then comes out of the control box and is attached to the end of handle 52. A weight 74 is mounted on piston 66 to pull on the cable and biases the stator blade into the open position against the action of spring 54, as shown in FIG. 9 of the drawings, when the rotor shaft is stationary.

As shown in FIG. 7, the hydraulic cylinder 68 is operated by a hydraulic pump 76, which is itself operated from the output shaft 26 through belt 78 and pumps fluid from a tank 80 into the cylinder through line 82 at a rate dependent on the output speed of the shaft. Thus, the action of the weight 54 is counteracted by the pump 76 as the speed of the rotor increases and the loose in the rope is taken up by the action of spring 54 to close the stator blades gradually as the speed of the shaft 22 increases until an equilibrium is reached.

A safety speed limiter is also mounted on the top disc 10 and comprises a speed governor 84, which is coupled at one end to a lever 86 pivotally mounted on a bracket 88 secured to the disc 10. The other end of the lever 86 engages the end of safety pin 58, which is biased into a disengaging position by means of a spring 90. Under normal operating speed, the governor is in the position shown in FIG. 6 or 8, and the end of lever 86 engages the end of safety pin 58, so that rope 56 is attached to the end of the pin. However, when a maximum speed limit is exceeded for any reason, such as failure of the speed control mechanism disclosed above, the speed governor will move to the position shown in FIG. 11 when lever 86 will pivot to disengage safety pin 58 and release the rope 56. Release of the rope will automatically close the stator blades under the action of spring 54, as mentioned previously.

Although the invention has been disclosed with reference to a preferred embodiment, it is to be understood that it is not limited to such embodiment but by the scope of the claims only.

What I claim is:

1. A wind motor comprising:
   (a) a stator including imperforate top and bottom horizontal discs spacedly mounted on upstanding posts, an intermediate annular disc parallel to the top and bottom discs and also secured to said posts, and a plurality of directing blades pivotally mounted between said intermediate and bottom discs, said top and intermediate discs defining a space there between which is open to the exterior completely around said discs;
   (b) a rotor having a vertical shaft journalled at the center of said top and bottom discs and vertical blades secured to said shaft and extending radially towards the blades of the stator, whereby the wind is directed by the stator blades onto the rotor blades and ejected through the central opening in the intermediate disc and the space between the top and intermediate discs, said annular disc defining a central circular opening which is coaxial with said shaft and which has a diamater substantially equal to the rotor diamater; and
   (c) means for automatically varying the angular position of the stator blades between open and closed positions, so as to control the speed of the rotor; so arranged that the wind passing directly between said top and intermediate discs assists the ejection of the air from the rotor, and closing of the stator blades creates a suction of the trailing surface of the rotor blades, thus helping in retarding the rotor.

2. A wind motor as defined in claim 1, wherein said means for varying the angular position of the stator blades comprises a ring rotatably mounted on the rotor shaft below the bottom disc, a linkage interconnecting said ring to each of the stator blades for rotating the same, means for automatically rotating the ring in accordance with the speed of the shaft, said last named means comprising a spring interconnecting said ring to the stator for biasing the stator blades to a closed position, a rope having one end secured to said stator and its other end secured to said ring, a weight adapted to pull on said rope to rotate the ring against the action of the spring in a direction such as to open the stator blades, a hydraulic cylinder having its piston connected to the weight and a hydraulic pump operated by the rotor shaft for operating said hydraulic cylinder to counteract the action of the weight in accordance with the speed of the rotor, so as to allow the spring to close the stator blades as the speed of the shaft increases until an equilibrium is reached, and a safety speed limiter which includes a speed governor mounted on said shaft and a lever-actuating means responsive to said speed governor for releasing the one end of the rope from the stator when a predetermined speed limit is exceeded, thereby automatically allowing closure of the stator blades under the action of said spring.

* * * * *